(12) United States Patent
Qi et al.

(10) Patent No.: US 10,830,223 B2
(45) Date of Patent: Nov. 10, 2020

(54) PUMP SYSTEM

(71) Applicant: Dare Auto Inc, Plymouth, MI (US)

(72) Inventors: Feng Qi, Plymouth, MI (US); Liang Yang, Plymouth, MI (US); Junfeng Men, Plymouth, MI (US)

(73) Assignee: Dare Auto Inc., Plymouth, MI (US)

( * ) Notice: Subject to any disclaimer, the term of this patent is extended or adjusted under 35 U.S.C. 154(b) by 162 days.

(21) Appl. No.: 15/827,915

(22) Filed: Nov. 30, 2017

(65) Prior Publication Data

US 2018/0149172 A1     May 31, 2018

Related U.S. Application Data

(60) Provisional application No. 62/428,076, filed on Nov. 30, 2016.

(51) Int. Cl.
*F04B 39/00*     (2006.01)
*F04B 53/00*     (2006.01)
(Continued)

(52) U.S. Cl.
CPC ....... *F04B 39/0044* (2013.01); *B60H 1/3229* (2013.01); *F04B 39/121* (2013.01); *F04B 53/003* (2013.01); *F04B 53/16* (2013.01); *F04C 23/008* (2013.01); *F04D 29/60* (2013.01); *H02K 5/24* (2013.01); *F04B 17/03* (2013.01);
(Continued)

(58) Field of Classification Search
CPC ... H02K 5/00; H02K 5/04; H02K 5/24; F04B 39/0044; F04B 39/12; F04B 39/121; F04B 39/127; F04B 53/16; B60H 1/3229; B60H 1/00521; F16F 15/08; F04C 2230/604; F04C 23/008; F04C 2240/30; F04D 29/60; F04D 29/646
See application file for complete search history.

(56) References Cited

U.S. PATENT DOCUMENTS 540,207 A     9/1895     Butcher
1,842,198 A  *   1/1932     Price ........................ H02K 5/24
                                                      248/581

(Continued)

FOREIGN PATENT DOCUMENTS

DE        102006017011 A1     10/2007

OTHER PUBLICATIONS

Annex to Form PCT/ISA/206, Communication Relating to the Results of the Partial International Search in corresponding PCT Application No. PCT/US2017/063989 dated Mar. 14, 2018.

(Continued)

*Primary Examiner* — Peter J Bertheaud
(74) *Attorney, Agent, or Firm* — Young Basile Hanlon & MacFarlane, P.C.

(57) ABSTRACT

A pump system includes a pump, a mounting bracket, and three fastener assemblies. The pump includes a housing having three pump attachment features. The mounting bracket includes three bracket attachment features. The three fastener assemblies are each coupled to one of the pump attachment features and to one of the bracket attachment features to form an attachment. Each of three extend through the pump attachment feature, the bracket attachment feature, and the fastener assembly at each attachment. The three attachment axes are perpendicular to each other.

19 Claims, 12 Drawing Sheets

(51) Int. Cl.
*F04B 53/16* (2006.01)
*F04B 39/12* (2006.01)
*F04C 23/00* (2006.01)
*B60H 1/32* (2006.01)
*F04D 29/60* (2006.01)
*F04B 53/22* (2006.01)
*H02K 5/24* (2006.01)
*F04B 17/03* (2006.01)

(52) U.S. Cl.
CPC ......... *F04B 53/22* (2013.01); *F04C 2230/604* (2013.01); *F04C 2240/30* (2013.01)

(56) References Cited

U.S. PATENT DOCUMENTS

| | | | | |
|---|---|---|---|---|
| 2,469,936 | A | * | 5/1949 | Tabbert .................. F04C 23/00 418/39 |
| 2,540,767 | A | * | 2/1951 | Tabbert ................. F01C 21/102 418/2 |
| 2,787,065 | A | | 4/1957 | Bock |
| D191,772 | S | | 11/1961 | Levacy |
| 3,185,415 | A | * | 5/1965 | Thorn ..................... F16F 15/02 248/632 |
| 3,367,609 | A | * | 2/1968 | Latter ................... F04B 39/127 312/351 |
| 3,385,542 | A | * | 5/1968 | Enemark ............... F04B 39/127 248/637 |
| D224,082 | S | | 7/1972 | Kolstee |
| D244,083 | S | | 4/1977 | Pfeiffer |
| 4,600,367 | A | | 7/1986 | Terauchi et al. |
| 4,810,174 | A | | 3/1989 | Stuckey et al. |
| 4,877,984 | A | * | 10/1989 | Colwell .................. F04B 17/03 310/66 |
| 5,030,067 | A | | 7/1991 | Ushiota et al. |
| D371,293 | S | | 7/1996 | Schoenmeyr |
| 5,704,574 | A | * | 1/1998 | Kasubke .................. F16L 3/12 248/316.1 |
| 5,799,923 | A | | 9/1998 | Carr et al. |
| 6,011,336 | A | * | 1/2000 | Mathis .................... F16F 1/376 248/628 |
| 6,132,183 | A | * | 10/2000 | Li ....................... F04B 39/0033 248/638 |
| 6,135,726 | A | | 10/2000 | Robertson et al. |
| 6,349,918 | B1 | | 2/2002 | Bunker |
| 6,352,247 | B1 | * | 3/2002 | Ishikawa ............... F01C 21/007 248/638 |
| 6,499,964 | B2 | * | 12/2002 | Staton .................... F04C 11/008 417/310 |
| 6,543,741 | B1 | * | 4/2003 | Li ....................... F04B 39/0044 248/638 |
| D601,411 | S | | 10/2009 | Barkdoll et al. |
| 7,819,638 | B2 | * | 10/2010 | Grimm ............. B60H 1/00507 248/603 |
| 8,147,219 | B2 | * | 4/2012 | Cho ....................... F04B 17/03 403/359.1 |
| 8,152,128 | B2 | | 4/2012 | Asplund et al. |
| 8,152,490 | B2 | * | 4/2012 | Iguchi ................ F04C 18/0215 417/410.1 |
| 8,863,648 | B2 | | 10/2014 | Mori et al. |
| 8,905,726 | B2 | * | 12/2014 | Katano .................. F04B 39/06 417/360 |
| 9,518,590 | B2 | * | 12/2016 | Arai .................... F04D 29/4206 |

OTHER PUBLICATIONS

Design U.S. Appl. No. 29/586,008, filed Nov. 30, 2016.

* cited by examiner

PUMP SYSTEM

CROSS-REFERENCE TO RELATED APPLICATION(S)

This application claims priority to and the benefit of U.S. Provisional Patent Application No. 62/428,076 filed Nov. 30, 2016, the entire disclosure of which is incorporated by reference herein.

TECHNICAL FIELD

This disclosure relates to pumps and mounting pumps and, in particular, mounting steering pumps in a vehicle.

SUMMARY

Disclosed herein are implementations of a pump system. The pump system includes a pump, a mounting bracket, and three fastener assemblies. The pump includes a housing having three pump attachment features. The mounting bracket includes three bracket attachment features. The three fastener assemblies are each coupled to one of the pump attachment features and to one of the bracket attachment features to form an attachment. Each of three attachment axes extend through the pump attachment feature, the bracket attachment feature, and the fastener assembly at each attachment. The three attachment axes are perpendicular to each other.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Referring to FIGS. 1-4, a pump system 10 (e.g., steering pump system) includes a pump 20 (e.g., steering pump), a mounting bracket 40, and a plurality of fastener assemblies 60. The mounting bracket 40 is configured to couple to the pump 20 with the fastener assemblies 60 and, thereby, mount the pump 20 to a vehicle structure 2 of a vehicle (e.g., passenger car, truck, etc.).

Figure 1:
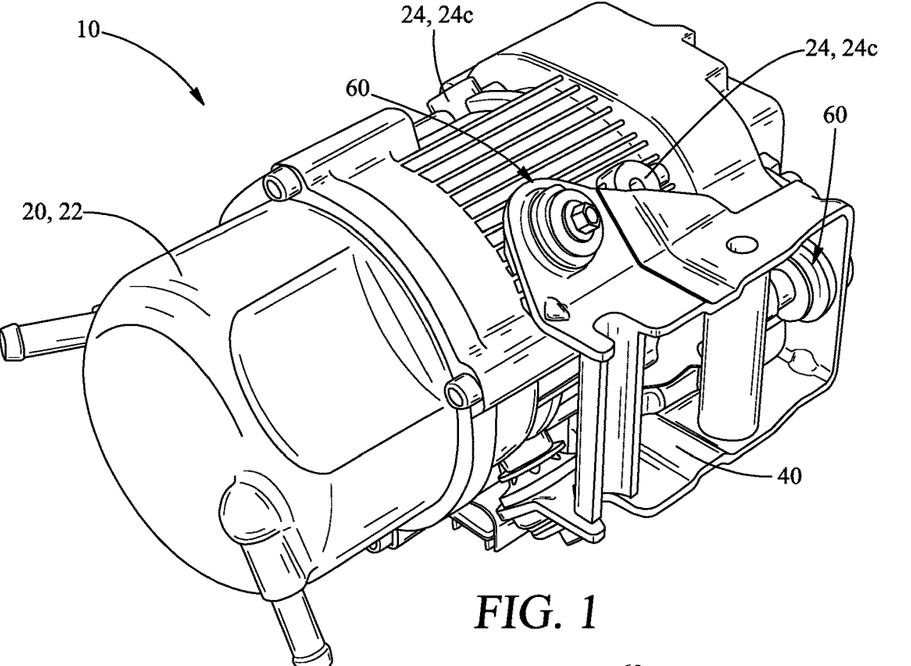
FIG. 1 is a bottom, front, right perspective view of a steering pump system.
Figure 2:
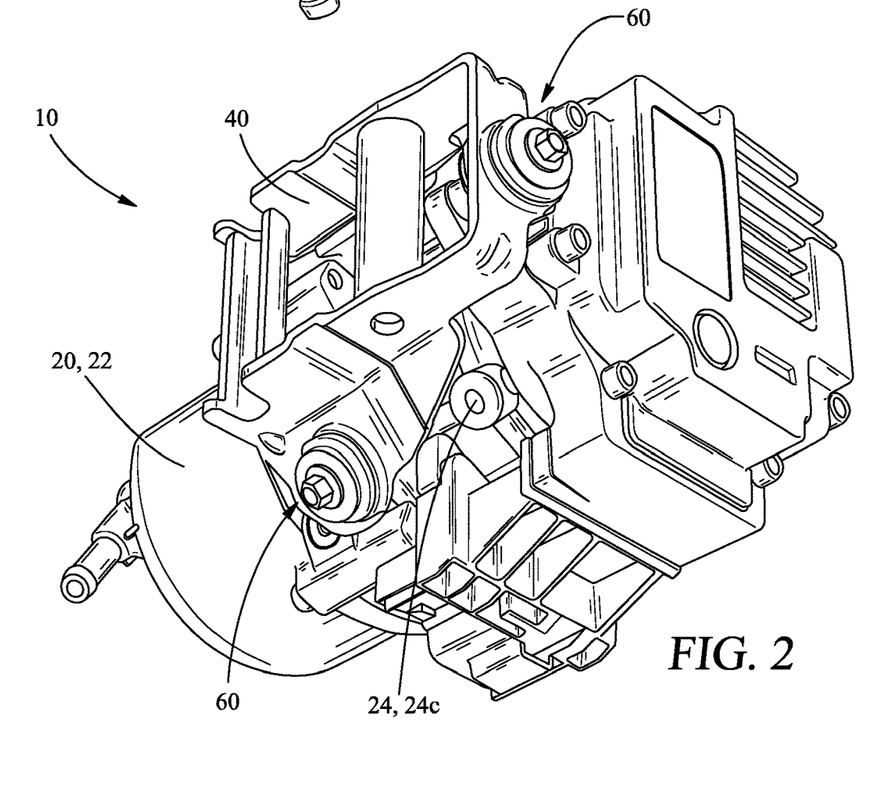
FIG. 2 is a bottom, rear, left perspective view of the steering pump system shown in FIG. 1.
Figure 3:
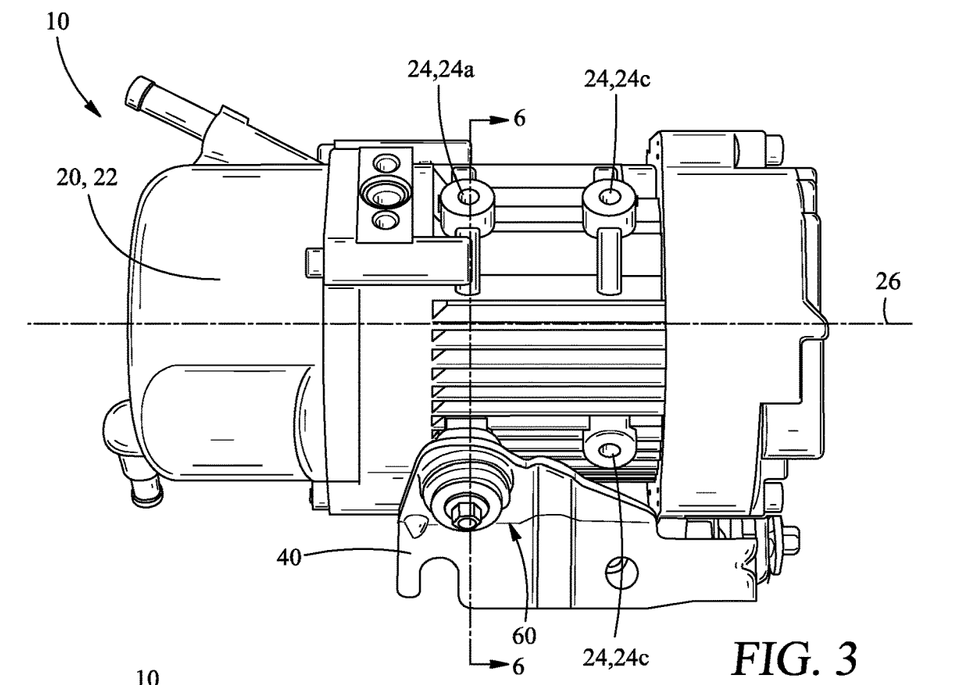
FIG. 3 is a right elevation view of the steering pump system shown in FIG. 1.
Figure 4:
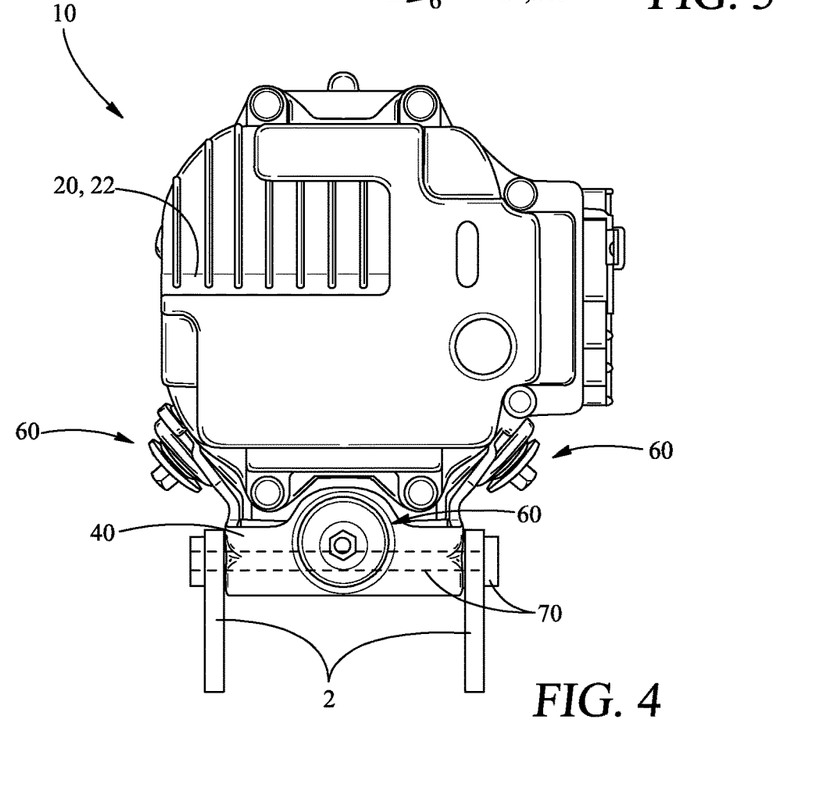
FIG. 4 is a rear elevation view of the steering pump system shown in FIG. 1.
Figure 5A:
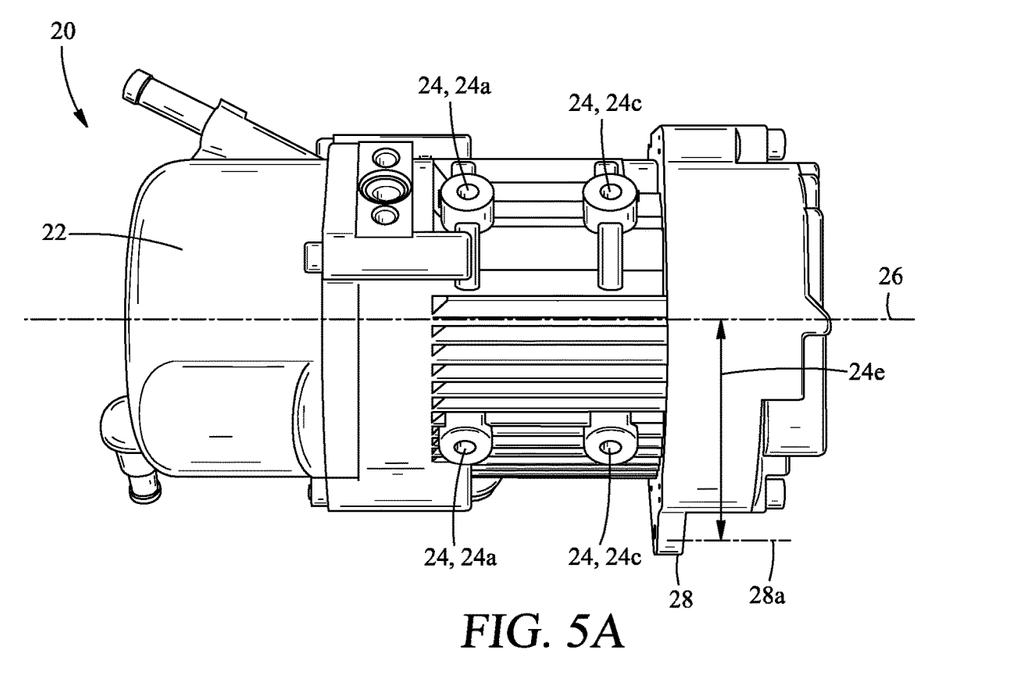
FIG. 5A is a right elevation view of a steering pump of the steering pump system shown in FIG. 1
Figure 5B:
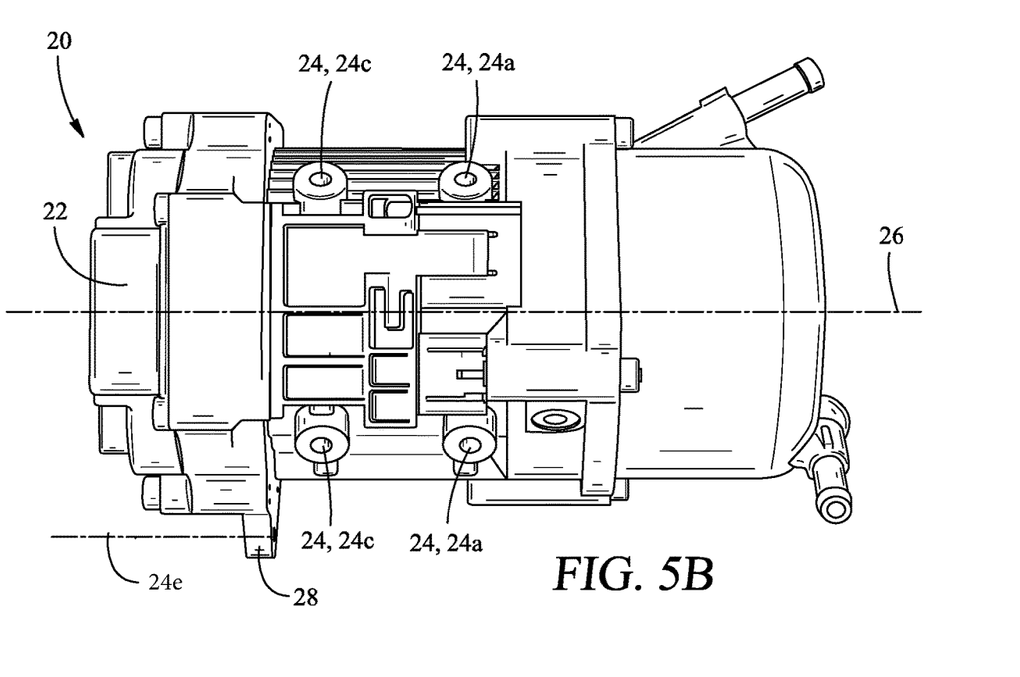
FIG. 5B is a left elevation view of the steering pump shown in FIG. 5A.
Figure 6:
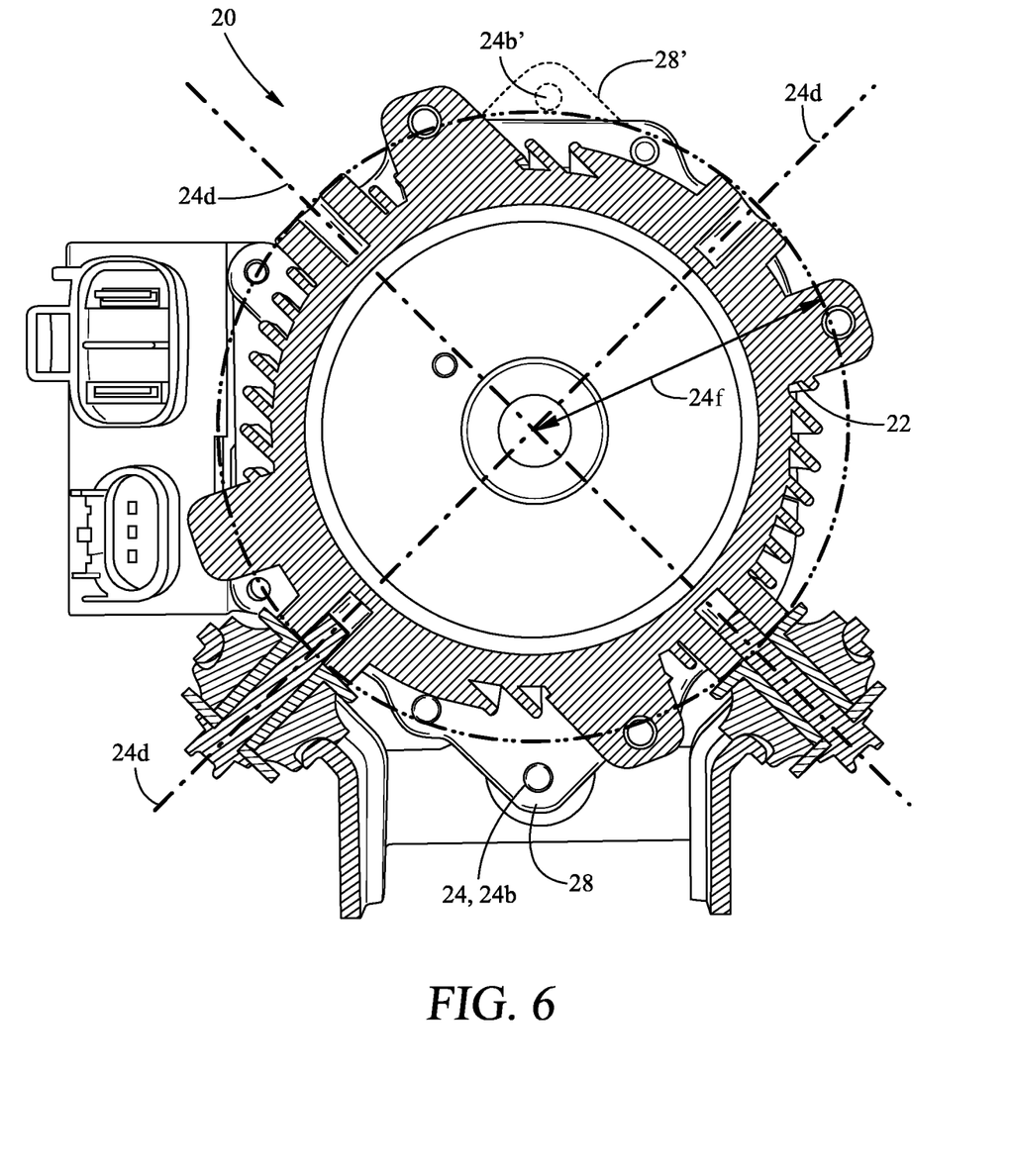
FIG. 6 is a cross-sectional view of the pump system taken along line 6-6 in FIG. 3.

Referring also to FIGS. 5-6, the pump 20 may be configured as an electronic hydraulic power steering (EHPS) pump, which is configured to supply hydraulic pressure to a steering gear of a vehicle (not shown; e.g., rack and pinion or recirculating ball steering gear). The pump 20 includes a housing 22, which contains internal components (not shown) that may include an electronic controller, electronic motor, and a hydraulic pump gear.

The housing 22 of the pump 20 and the mounting bracket 40 include corresponding attachment features that facilitate coupling the pump 20 to the mounting bracket 40. More particularly, the housing 22 of the pump 20 includes pump attachment features 24 (e.g., threaded apertures) that are coupled to bracket attachment features 44 (e.g., apertures) with one of the fastener assemblies 60 (e.g., dampener assemblies). The pump attachment features 24 are positioned and oriented on the housing 22 to support the pump 20 to transfer loading via the fastener assemblies 60 to the mounting bracket 40 and, ultimately, to the vehicle structure 2 (depicted schematically in FIG. 4). Such loading may, for example, be from gravity, dynamic loading of the vehicle (e.g., accelerating, braking, turning, road conditions), and operation of the pump 20 (e.g., start/stop the electric motor). The pump attachment features 24 may, for example, be threaded receptacles that are recessed relative to an outer periphery of the housing 22, are formed in flanges 28, and/or are formed within bosses (e.g., protrusions) that protrude outward from the outer periphery of the housing 22.

Referring to FIGS. 5A-6, the pump attachment features 24 include two or more peripheral pump attachment features 24a, 24c and one or more lateral pump attachment features 24b. The pump attachment features 24 used in conjunction with the bracket attachment features 44 and the fastener assemblies 60 may be positioned and oriented in three perpendicular attachment axes (e.g., providing dampening in x, y, and z axes), at three or more locations, and/or to form three or more attachments. Furthermore, some of the pump attachment features 24 may not be used for a given application. The pump attachment features 24 that are unused may, for example and as described in further detail below, provide flexibility for using a single design of the pump 20 in different applications (e.g., left/right hand drive versions of a common vehicle, different models of vehicles, vehicles from different manufacturers, etc.).

The peripheral pump attachment features 24a are spaced apart about the housing 22. For example, the housing 22 has a length, a width, and a height, while the peripheral pump attachment features 24a are spaced apart on the sides of the housing 22 at different locations along the length, width, and height of the housing 22. The location and/or orientation of the peripheral pump attachment features 24a may also be defined relative to a central axis 26, for example, according to rotational, radial, and axial positions measured relative to the central axis 26. The central axis 26 may correspond to an axis of rotation of various moving components within the housing 22, correspond to a shape of the housing 22 (e.g., being generally cylindrical as shown), and/or be defined relative to the peripheral pump attachment features 24a, 24c (e.g., radial position, intersecting axes, etc.).

More specifically, the peripheral pump attachment features 24a, 24c may be spaced apart rotationally by approximately 90 degrees relative to the central axis 26 (e.g., at two, three, or four different rotational positions). The peripheral pump attachment features 24a, 24c, are also arranged at a common radial position 24f (i.e., common radial distance measured radially relative to the central axis 26; see FIG. 6, indicated by dash-dot line). One or more of the peripheral pump attachment features 24a, 24c may also be arranged at a common axial position (e.g., lengthwise position; measured along the central axis 26). For example, the peripheral pump attachment features 24a are arranged at a first axial position, while the peripheral pump attachment features 24c are spaced apart at a second axial position. According to other exemplary embodiments, the peripheral pump attachment features 24a, 24c may be arranged in other suitable positions (e.g., at different rotational, radial, and axial positions). For example, various subgroups (e.g., left and right, upper and lower, etc.) of the peripheral pump attachment features 24a, 24c may be arranged relative to different axes (e.g., as mirror images with parallel axes).

The peripheral pump attachment features 24a are additionally oriented relative to each other to receive the fastener assemblies 60 in different directions. For example, attachment axes 24d (e.g., peripheral attachment axes) pass through the peripheral pump attachment features 24a (e.g., forming a central axis of the threaded bore forming the peripheral pump attachment features 24a, as shown in FIG. 6; similar attachment axes pass through the peripheral attachment features 24c). The attachment axes 24d may intersect each other at a substantially perpendicular angle and/or intersect or pass in close proximity to the central axis 26 (e.g., at a common intersection for those attachment axis 24d located at the same axial position along central axis 26).

As referenced above, the housing 22 may include peripheral pump attachment features 24a, 24c that are not used in a particular application. As shown, the housing 22 includes eight peripheral pump attachment features 24a, 24c of which only two of the peripheral pump attachment features 24a are used with the mounting bracket 40 (i.e., peripheral pump attachment features 24a at left and right forward/lower locations). The peripheral pump attachment features 24a (e.g., a first group of peripheral pump attachment features) are arranged at four different rotational positions that are spaced apart by 90 degrees, at a common radial position, and at a first axial position. The peripheral pump attachment features 24c (e.g., a second group of peripheral pump attachment features) are arranged at the same four rotational positions as the peripheral pump attachment features 24a, at the common radial position, and at a second axial position that is spaced apart from the first axial position (e.g., being between a third axial location of the lateral pump attachment feature 24b and the first axial position). In other applications and/or with other mounting brackets 40, alternatives of which are discussed below, different ones of the peripheral pump attachment features 24a, 24c may be used (e.g., two, three, or four at upper or lower, forward or rearward, and right or left locations), but which are at two of the rotational positions (e.g., the utilized peripheral pump attachment features 24a, 24c are at adjacent rotational positions and/or 90 degrees apart). Furthermore, one or more of the peripheral pump attachment features 24a, 24c that are unused may instead be omitted, such that the housing 22 includes only those peripheral pump attachment features 24a, 24c that are to be used in a particular application.

The lateral pump attachment feature 24b of the housing 22 is positioned and oriented for being coupled to a corresponding lateral bracket attachment feature 44b with one of the fastener assemblies 60. The lateral pump attachment feature 24b is spaced axially away from peripheral pump attachment features 24a, 24c. For example, the lateral pump attachment feature 24b may defined by a flange 28 that protrudes radially away from the periphery of the housing 22. The lateral pump attachment features 24b may also be spaced rotationally from the peripheral pump attachment features 24a, 24c, for example, by being rotationally spaced 45 degrees between two such peripheral pump attachment features 24a, 24c that are utilized in a given application. For example, another attachment axis 24d (e.g., lateral attachment axis) passes through the lateral pump attachment feature 24b (e.g., forming a central axis of the threaded bore forming the lateral pump attachment feature 24b), which may also extend parallel with and spaced apart from the central axis 26 (e.g., below and/or rotationally in between two peripheral pump attachment features 24a, 24c that are utilized in a given application). The other attachment axis 24d may additionally be arranged substantially perpendicular to the attachment axes 26d that pass through the peripheral pump attachment features 24a, 24c.

The housing 22 may also include a second flange 28' (shown in phantom in FIG. 6), generally opposite a first of the flanges 28', which defines a second lateral pump attachment feature 24b'. For example, the two flanges 28 and the two lateral pump attachment features 24b, 24b' thereof may be arranged at the same positions, respectively, relative to upper ones and lower ones of the peripheral pump attachment features 24a, 24c. For example, the second lateral pump attachment feature 24b' and the second flange 28' are at a rotational position spaced apart by substantially 180 degrees from the lateral pump attachment feature 24b (e.g., first feature) and the flange 28 (e.g., first flange), but at the same radial and axial positions. The second flange 28', as with the peripheral pump attachment features 24a, 24c, which are not used in particular vehicle applications, may be utilized in another vehicle application or when not needed simply be not used or be removed (e.g., by cutting the second flange 28).

Referring to FIGS. 7-8, 9-14, and 15, the mounting bracket 40 includes a base 42 (e.g., primary or peripheral member or structure, etc.), which forms the bracket attachment features 44. The bracket attachment features 44 are, for example, apertures (e.g., circular or cylindrical holes having a center point or central axis) configured to receive and engage an isolator 62 of the fastener assembly 60. The bracket attachment features 44 may be formed in bosses or protrusions that extend (e.g., outward) from surrounding regions (e.g., otherwise planar surfaces) of the base 42 and/or may be formed by a stamping operation. The base 42 of the mounting bracket 40 may, for example, be a unitary stamped aluminum component to which cross-members 52 are coupled. Alternatively, the base 42 may be made from multiple components (e.g., each component forming one or more of the various segments), different manufacturing methods, and/or different materials.

The base 42 is generally U-shaped having two side segments 46 and an end segment 48 extending between the two side segments 46. The end segment 48 can define a lateral attachment feature 44b. The side segments 46 may, for example, be substantially planar segments that extend parallel with each other, while the end segment 48 is another substantially planar segment that extends perpendicular relative to each of the two side segments 46. The side segments 46 may additionally include ribs 46a (e.g., strengthening ribs or bends). The base 42 may also include ribs 42a (e.g., strengthening ribs or bends) at joints or corners between the side segments 46 and the end segment 48.

The base 42 additionally includes flange segments 50 (e.g., attachment flanges), such as two flange segments 50, that extend outward from the side segments 46. Each of the flange segments 50 defines one or more peripheral bracket attachment features 44a of the bracket attachment features 44. The flange segments 50 position and orient the peripheral bracket attachment features 44a for coupling to corresponding ones of the peripheral pump attachment features 24a, 24c of the pump 20 with one of the fastener assemblies 60. More specifically, the attachment axes 24d pass through the peripheral bracket attachment features 44a (e.g., through a center point or axis thereof, and/or at a substantially perpendicular angle relative to portions of the bracket 40 immediately surrounding the peripheral bracket attachment features 44).

Figure 7:
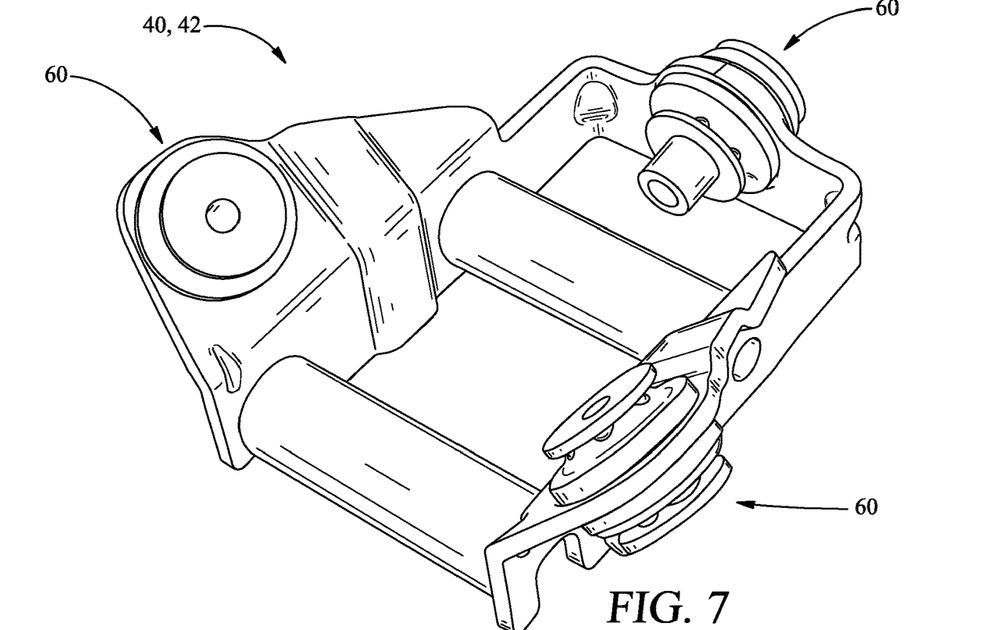
FIG. 7 is an upper, front, right perspective view of a mounting bracket and fastener assemblies of the steering pump system shown in FIG. 1.
Figure 8:
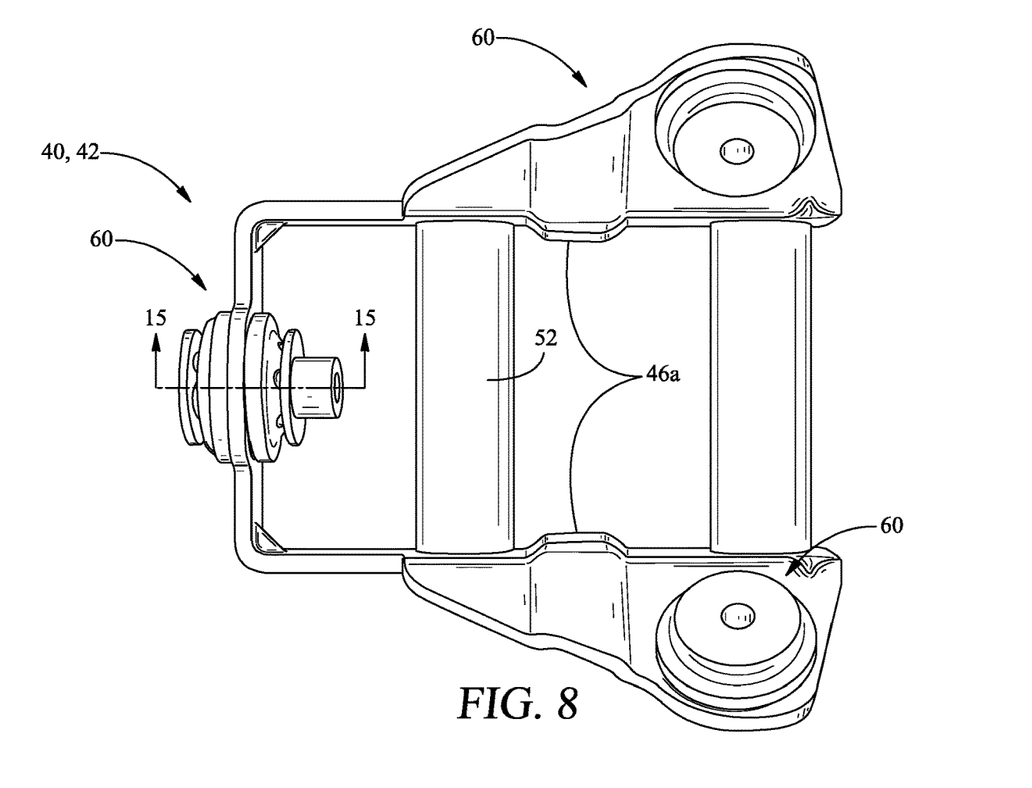
FIG. 8 is a top view of the mounting bracket and fastener assemblies shown in FIG. 7.
Figure 9:
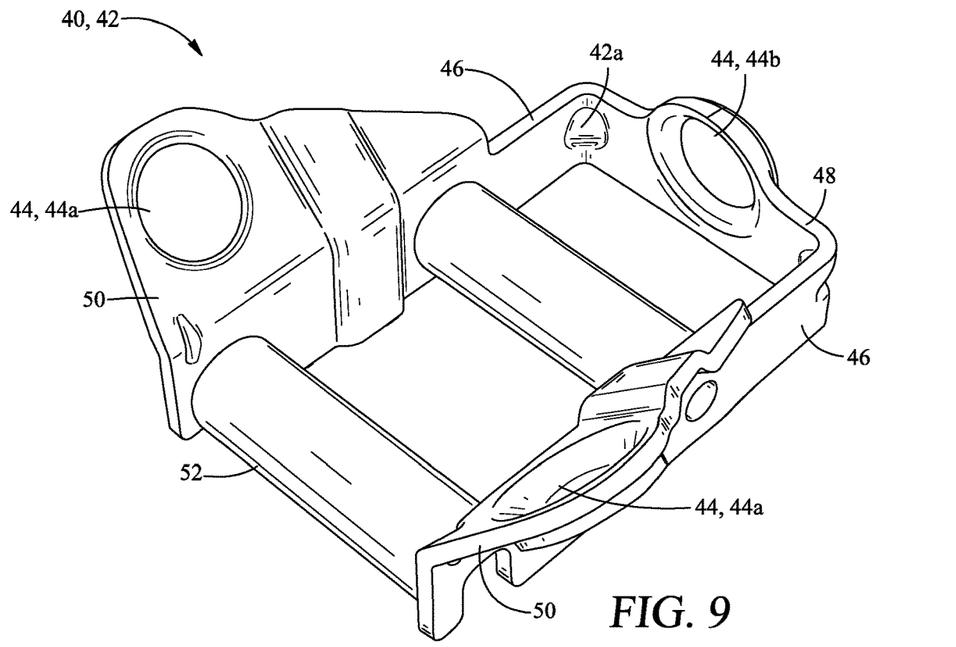
FIG. 9 is an upper, front, right perspective view of the mounting bracket of the steering pump system shown in FIG. 1.
Figure 10:
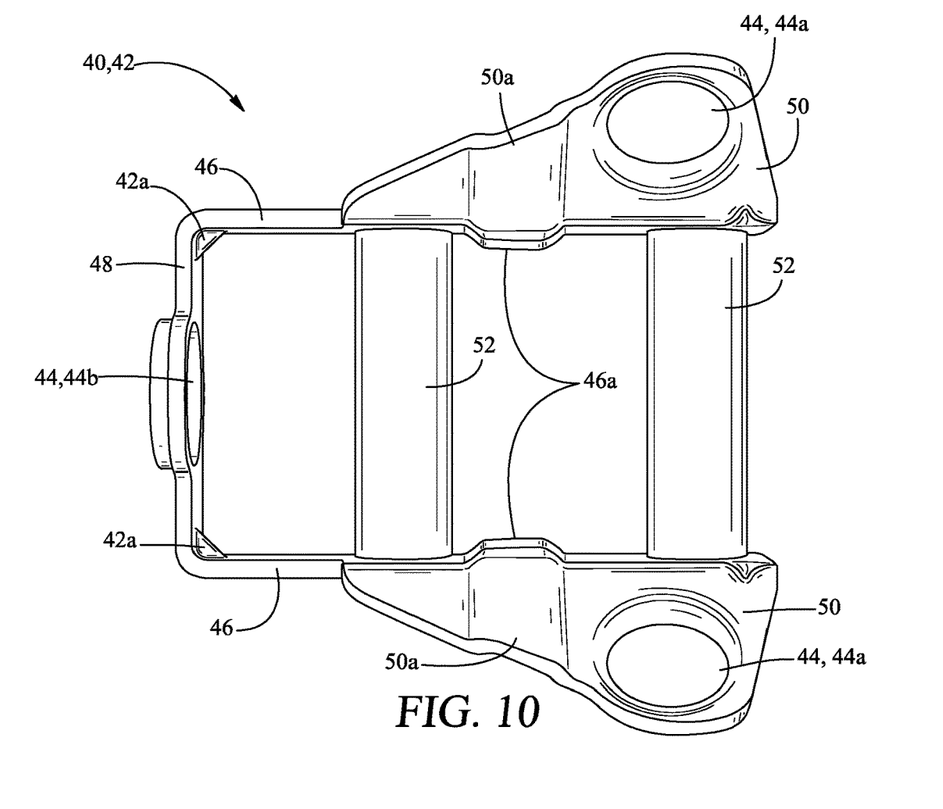
FIG. 10 is a top view of the mounting bracket shown in FIG. 9.

The flange segments 50 are, for example, each a substantially planar segment that extends from one of the side segments 46. For example, each of the flange segments 50 extends outward from one of the side segments 46 at an angle of approximately 135 degrees relative thereto. The flange segments 50, thereby, form a substantially perpendicular angle therebetween and/or define a recess therebetween for receiving the pump 20. The relative angle of the flange segments 50 also corresponds to the 90 degree angle between the peripheral pump attachment features 24a of the pump 20. The peripheral bracket attachment features 44a, thereby, are coaxial with and positioned radially outward from the peripheral pump attachment features 24a, 24c of the pump 24. The flange segments 50 may additionally include ribs 50a (e.g., strengthening ribs or bends), which may be continuous with the ribs 46a of the side segments 46.

Figure 19:
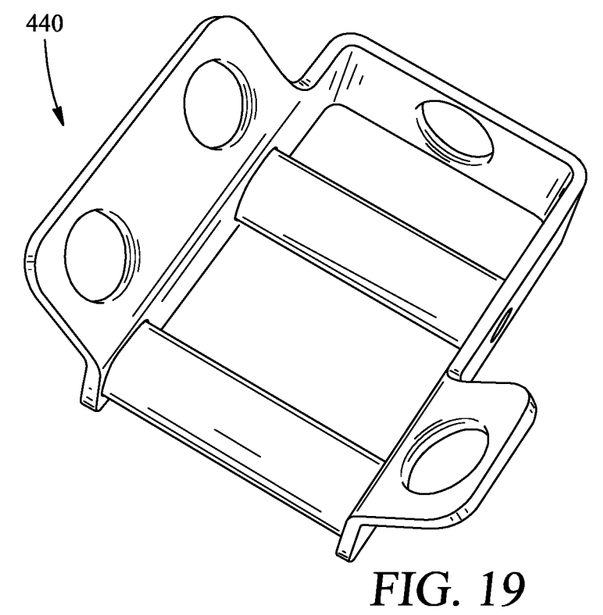
FIG. 19 is an upper, front, right perspective view of another embodiment of a mounting bracket that may be used in the steering pump system shown in FIG. 1.
Figure 20:
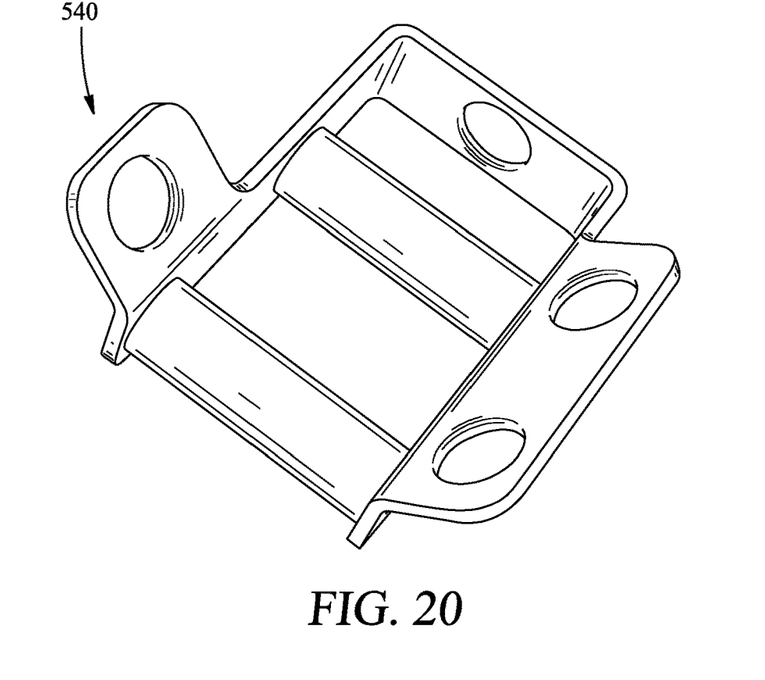
FIG. 20 is an upper, front, right perspective view of another embodiment of a mounting bracket that may be used in the steering pump system shown in FIG. 1.
Figure 21:
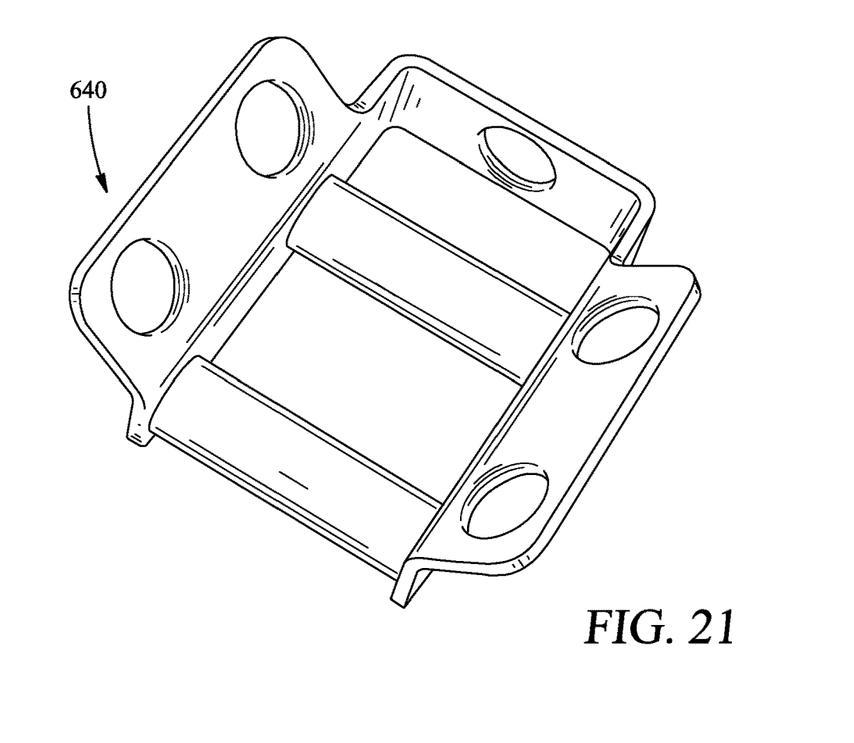
FIG. 21 is an upper, front, right perspective view of another embodiment of a mounting bracket that may be used in the steering pump system shown in FIG. 1.

The flange segments 50 may be configured in other manners. For example, while the flange segments 50 have an outer periphery that is generally triangular, the flange segments 50 may instead have an outer periphery that is substantially rectangular (see further embodiments of mounting brackets 140, 240, 340, 440, 540, and 640 shown in FIGS. 16-21). Furthermore, while the flange segments 50 include peripheral bracket attachment features 44a that correspond to the peripheral pump attachment features 24a at one axial position, two, three, or four of the peripheral bracket attachment features 44a may instead be provided at different axial positions from each other (see the embodiments shown in FIGS. 17-21). Even further, each of the flange segments 50 may include more than one of the peripheral bracket attachment features 44a (e.g., for a total of three to four peripheral bracket attachment features 44a; see embodiments shown in FIGS. 19-21). As a result, the mounting bracket 40 may be configured to attach to one or two of the peripheral pump attachment features 24a of the pump 20 and/or one or two of the other peripheral pump attachment features 24c of the pump 20 (for a total of between two and four peripheral attachment locations). Still further, the peripheral bracket attachment features 44a may not be surrounded by or otherwise formed in in protrusions or bosses (see again the embodiments shown in FIGS. 16-21).

The bracket attachment features 44 additionally include a lateral bracket attachment feature 44b, defined by end segment 48, that corresponds to the lateral pump attachment feature 24b of the pump 20. The lateral bracket attachment feature 44b is positioned and oriented for coupling to the lateral pump attachment feature 24b of the pump 20 with one of the fastener assemblies 60. For example, the attachment axis 24e passes through lateral bracket attachment feature 44b and the lateral pump attachment feature 24b (e.g., through a center point or axis thereof, and/or at a substantially perpendicular angle relative to portions of the end segment 48 and the flange 28 immediately surrounding the lateral bracket attachment feature 44b and the lateral pump attachment feature 24b).

Figure 11:
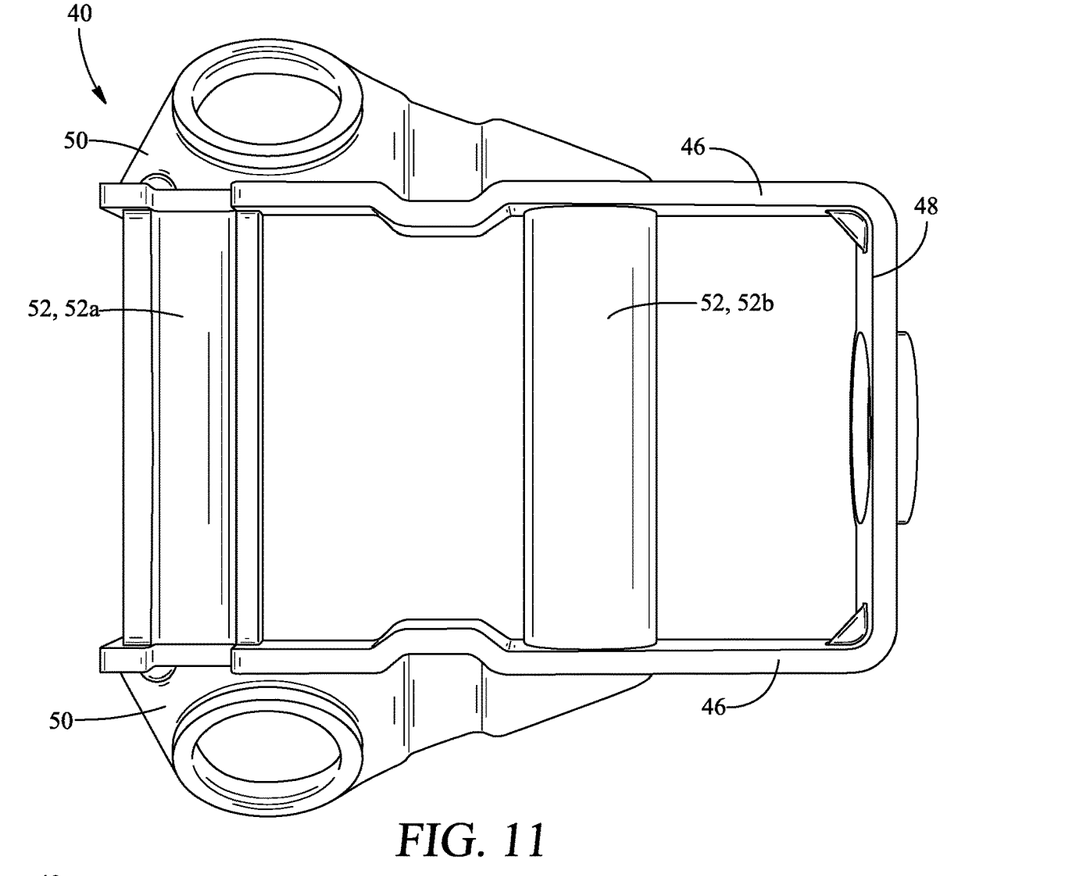
FIG. 11 is a bottom view of the mounting bracket shown in FIG. 9.
Figure 12:
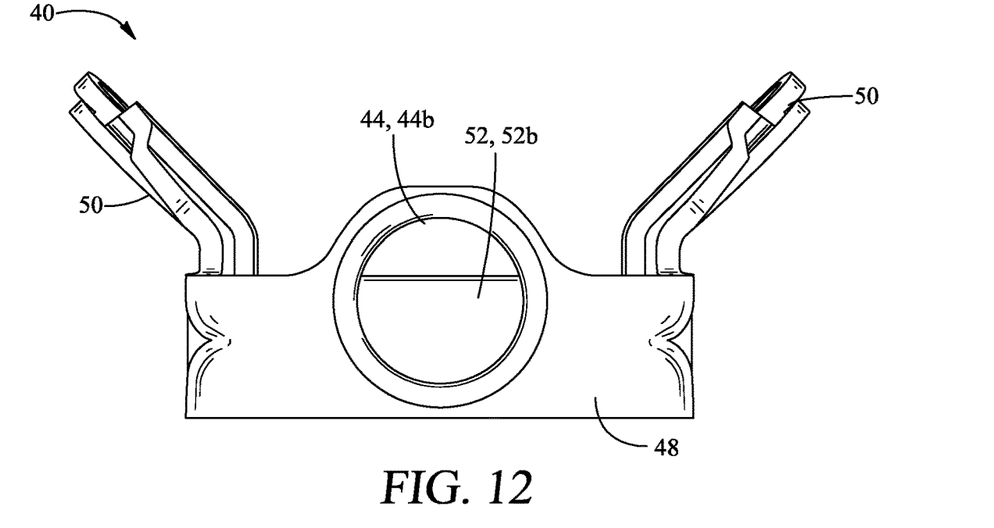
FIG. 12 is a rear view of the mounting bracket shown in FIG. 9.
Figure 13:
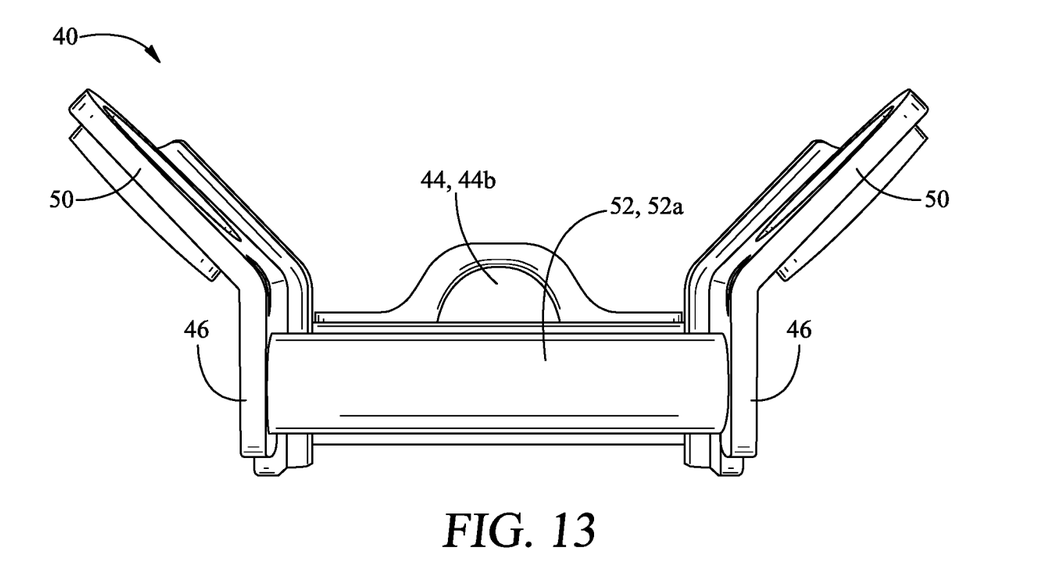
FIG. 13 is a front view of the mounting bracket shown in FIG. 9.
Figure 14:
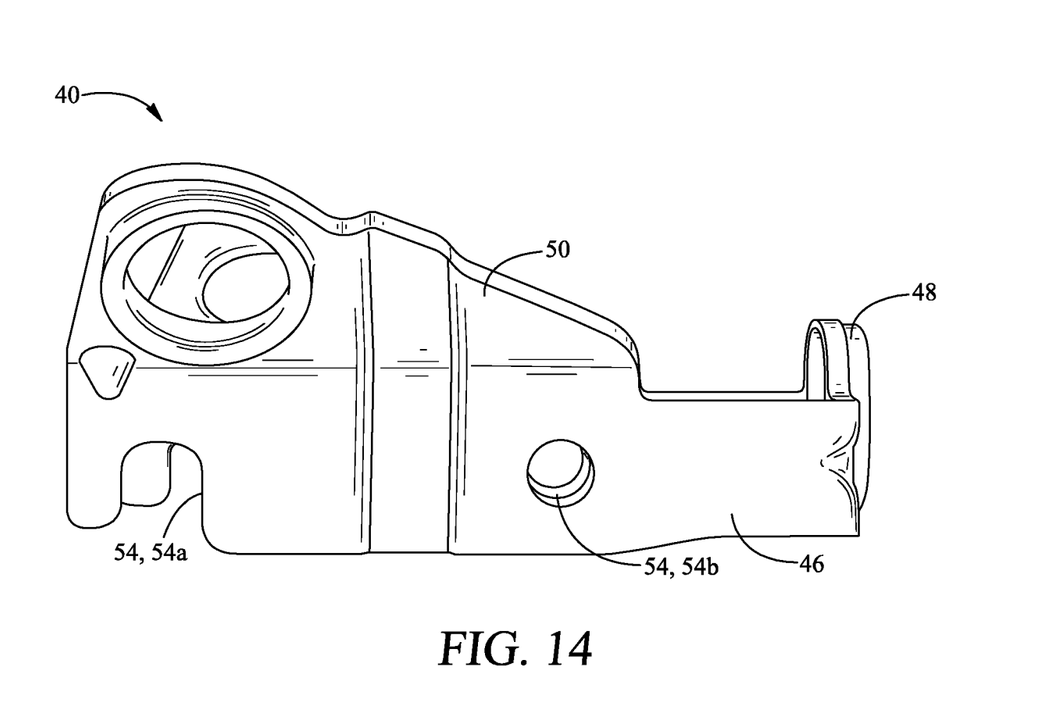
FIG. 14 is a right side view of the mounting bracket shown in FIG. 9.

The mounting bracket 40 may additionally include one or more cross-members 52 (e.g., two as shown). Each cross-member 52 is coupled (e.g., via welding) between the two side segments 46 of the base 42. Each cross-member 52 is an elongated member having an open cross-section (e.g., U-shaped having an open region facing downward and/or away from the pump 20; see cross-member 52a) or a closed (e.g., circular; see cross-member 52b) cross-section.

The side segments 46 of the base 42 of the mounting bracket 40 each additionally include vehicle attachment features 54 (e.g., an open or closed aperture), which are associated (e.g., positioned coincident with) the cross-members 52, so as to receive a fastener 70 (e.g., bolt; depicted schematically in FIG. 4) therethrough. The side segments 46 and the cross-members 52 are positioned between the vehicle structure 2, so as to be compressed therebetween by the fasteners 70. As is shown in FIGS. 11 and 14, the mounting bracket 40 may include open attachment features 54a (e.g., slots) and an open cross-member 52a at a distal position from the end segment 48. The mounting bracket 40 may additionally include closed attachment features 54b (e.g., apertures) and a closed cross-member 52b at a proximal position from the end segment 48. Alternatively, the mounting bracket 40 may include only open, only closed, or differently arranged open/closed attachment cross-members 52 and open/closed attachment features 54.

Figure 15:
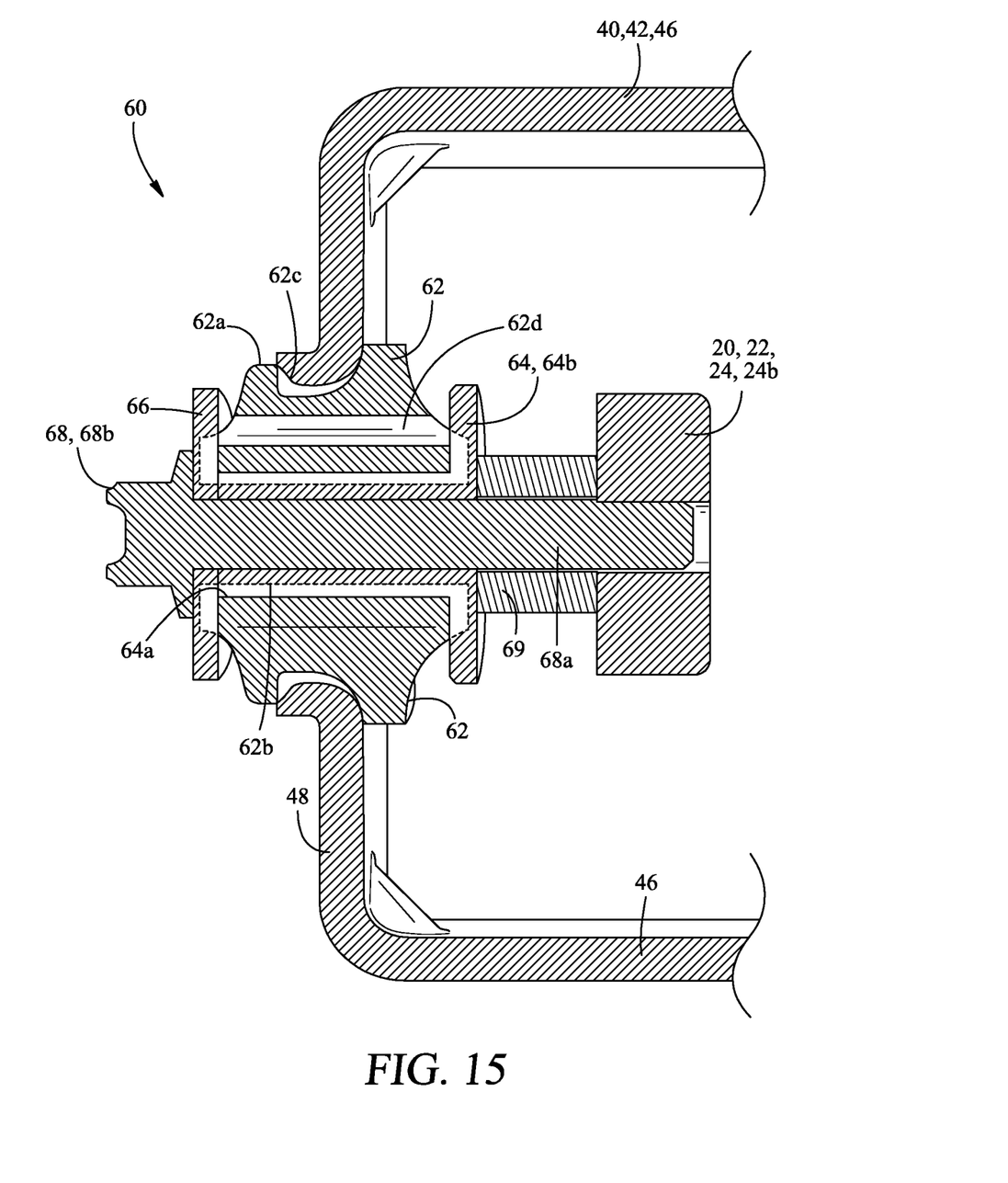
FIG. 15 is a cross-sectional view of the mounting bracket and one of the fastener assemblies taken along line 15-15 from FIG. 3.
Figure 16:
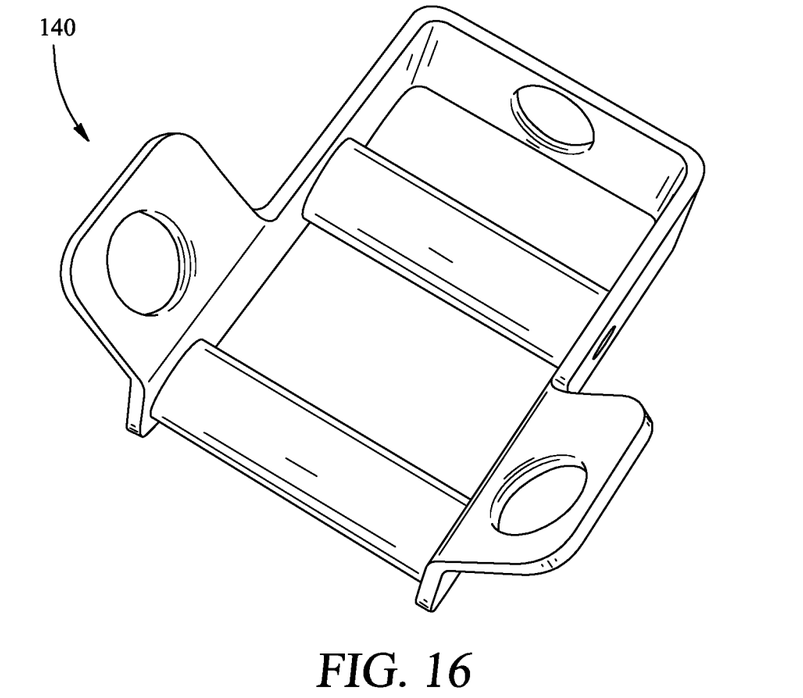
FIG. 16 is an upper, front, right perspective view of another embodiment of a mounting bracket that may be used in the steering pump system shown in FIG. 1.
Figure 17:
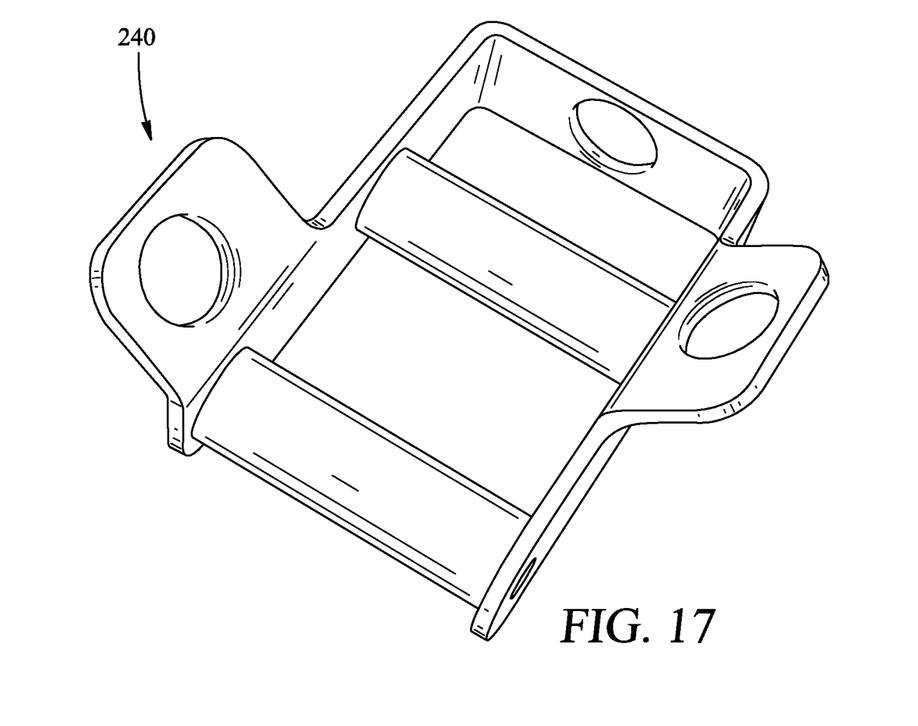
FIG. 17 is an upper, front, right perspective view of another embodiment of a mounting bracket that may be used in the steering pump system shown in FIG. 1.
Figure 18:
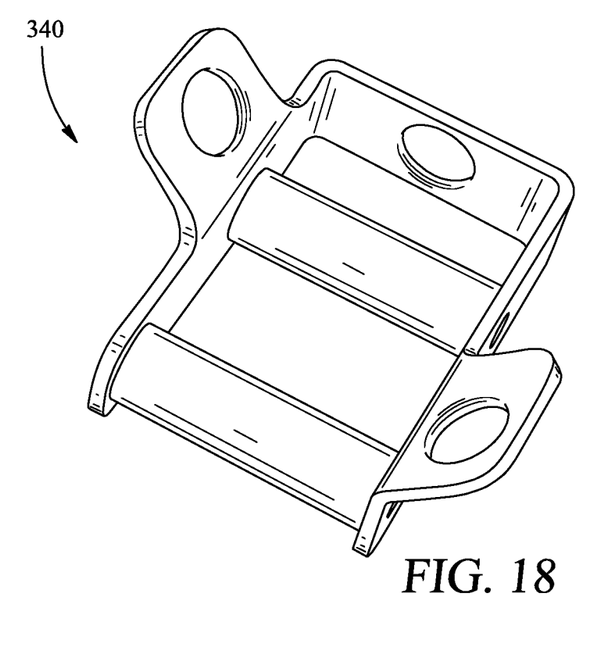
FIG. 18 is an upper, front, right perspective view of another embodiment of a mounting bracket that may be used in the steering pump system shown in FIG. 1.

Referring to FIG. 15, each of the fastener assemblies 60 is configured to couple the pump 20 to the mounting bracket 40 (e.g., thereby forming an attachment). The fastener assemblies 60 are also configured to dampen vibrations and other loading therebetween. The fastener assemblies 60 are also configured to provide mechanical fail-safe retention of the pump 20 to the mounting bracket 40.

The fastener assembly 60 generally includes the isolator 62 (e.g., grommet, damper, etc.), a T-washer 64, a plate washer 66, and a threaded fastener 68 (e.g., screw). The fastener assemblies 60 may additionally include a spacer 69 (e.g., tubular member) arranged between the T-washer 64 and the pump attachment feature 24 of the housing 22 of the pump 20. When coupled to the pump 20 and to the mounting bracket 40, the attachment axes 24d, 24e each pass through one of the fastener assemblies 60 (e.g., through axes of the isolator 62, the T-washer 64, the plate washer 66, and/or the threaded fastener 68).

The isolator 62 is an annular member made from an elastomeric material, which extends axially from a first end to a second end. The isolator 62 includes an outer periphery 62a that engages to bracket attachment features 44 of the mounting bracket to be retained thereon, and an inner periphery 62b that receives the T-washer 64 and threaded fastener 68 therethrough. More particularly, the outer periphery 62a is configured to be received within the aperture forming the bracket attachment feature 44 of the mounting bracket 40. The outer periphery 62a includes a peripheral channel 62c that receives therein a portion of the mounting bracket 40 (e.g., the flange segments 50) that defines the bracket attachment feature 44. The inner periphery 62b of the isolator 62 is substantially cylindrical, so as to receive the T-washer 64 therethrough, which in turn receives a threaded shaft 68a (threads not shown) of the elongated fastener 68 therethrough. In FIG. 15, the mounting bracket 40 is depicted as overlapping the peripheral channel 62c; in use, however, the mounting bracket 40 will compress the isolator 62 against the peripheral channel 62c. The peripheral channel 62c is axially located at a mid-point between the first end and the second end of the isolator 62.

Vibration dampening characteristics of the isolator 62 may be tuned according to various requirement of a particular application, for example, by using materials with particular dampening properties (e.g., rubbers or polymers with different elasticity characteristics) and/or by including various structure features (e.g., one or more apertures or slots 62d).

The T-washer includes a sleeve portion 64a and a flange 64b (e.g., radial flange portion). The sleeve portion 64a is substantially cylindrical so as to be inserted into (e.g., received by) the inner periphery 62b of the isolator 62. The sleeve portion 64a is additionally tubular (e.g., with a central aperture), so as to receive the elongated fastener 68 therethrough. The sleeve portion 64a of the T-washer 64 may be configured without threads or with threads (e.g., as a nut) for engaging the threaded fastener 68.

The flange 64b of the T-washer 64 is arranged between the housing 22 and the first end (i.e., proximate the housing 22) of the isolator 62 (shown as overlapping the flange 64b, but in use would be compressed thereagainst). The plate washer 66 is received between the second end (i.e., distal from the housing 22) of the isolator 62 (shown as overlapping the plate washer 66, but in use would be compressed thereagainst) and a head 68b of the elongated fastener 68. The elongated fastener 68 is coupled to the pump attachment feature 24 (e.g., with the threaded shaft 68a being threaded into the threaded aperture formed thereby), and compresses the isolator 62 between the housing 22 (and the flange 64b of the T-washer 64 thereagainst) and the head 68b of the elongated fastener 68 (and the plate washer 66 thereagainst). When the isolator 62 is compressed, the portions of the isolator 62 surrounding the peripheral channel 62c compress therebetween the portions of the mounting bracket 40 that define the bracket attachment features 44 (e.g., apertures).

The fastener assembly 60 is additionally configured as a mechanical fail-safe that prevents unintended separation between the pump 20 and bracket 40. More particularly, the plate washer 66 and the bracket attachment features 44 have relative geometries (e.g., shape and size) that prevent removal of the plate washer 66 through the aperture of the corresponding bracket attachment feature 44. For example, the plate washer 66 has an outer diameter that is larger than an inner diameter than that of the aperture of the bracket attachment feature 44. The orientation of the flange 64b of the T-washer 64 and the plate washer 66 may be reversed (i.e., with the plate washer 66 being proximate the housing 22) in which case the flange 64b is similarly configured to prevent removal thereof through the aperture of the corresponding bracket attachment feature 44.

A method is provided for providing the pump system 10 described above. The method includes a first step of providing the pump 20 with the housing 22 with the peripheral pump attachment features 24a, 24c at four rotational locations, at two axial locations, and one radial location relative to the central axis 26 of the pump 20 (i.e., totaling eight peripheral pump attachment features 24a, 24c as described above). The first step further includes providing the pump 20 with the lateral pump attachment features 24b, 24b' on the two flanges 28, 28' at rotational locations (e.g., 180 degrees apart) and at a third axial location, and being oriented with an axis perpendicular to axes of the peripheral pump attachment features 24a, 24c. In a second step, one of the two flanges 28, 28' is removed from the housing 22 of the pump 20. In a third step, a mounting bracket 40 is provided with at least two of the peripheral bracket attachment features 44a at two different rotational locations and having axes oriented perpendicular to each other. In the third step, the mounting bracket 40 additionally includes the lateral bracket attachment feature 44b whose axis is perpendicular to those of the peripheral bracket attachment features 44a. In a fourth step, three or more of the fastener assemblies 60 are provided and coupled to the bracket attachment features 44 of the mounting bracket 40 by inserting the isolator 62 into the apertures of the bracket attachment features 44. In a fifth step, the pump 20 is coupled to the mounting bracket 40 by coupling the threaded fasteners 68 of each of the fastener assemblies 60 to a corresponding one of the pump attachment features 24 of the pump 20. In a sixth step, which may occur before the fifth step, the mounting bracket 40 is coupled to the vehicle structure 2.

While the various attachment features of the pump 20 and the mounting bracket 40 have been described as apertures, it should be understood that the attachment features may take other suitable female forms (e.g., slots, recess, etc.), suitable male forms (e.g., bosses, protrusions, threaded shafts, etc.), and/or generally reverse the male/female orientation of such features in suitable manners. It should also be noted that the pump system 10 described above may instead be used in non-steering applications (e.g., being a pump system, such as for moving other fluids in an automotive or other application). Still further, while various directional terms have been described (e.g., upper, lower, left, right, front, rear), it should be noted that the pump system 10 described herein may be used in other orientations and, thus, such directional terms are not limiting but merely describe one such orientation of the pump system 10 disclosed herein.

The term "substantially" as used herein encompasses minor variances of the term associated therewith (e.g., angular or shape term), which may include variations in design and/or variances due to manufacturing. With respect to angular terms (e.g., perpendicular, parallel, or specific angles), the term substantially includes variances, for example, of +/−10, 5, 2, or 1 degree(s) (e.g., substantially perpendicular including 90+/−5 degrees). With respect to shapes (e.g., rectangular, circular, etc.), the term substantially includes variances, for example, in which a rectangle may have corners that are rounded and/or substantially perpendicular, or a circle may include a straight portion or otherwise non-constant radius. The term substantially planar includes variances, for example, in which a plane may be arranged between opposing surfaces of a feature (e.g., passing through the thickness of the segment), other features are included in the feature (e.g., a substantially planar segment may include a strengthening rib), and/or a surface of the feature may vary in flatness (e.g., a substantially planar segment may vary in flatness by +/−10% of a width, length, or thickness of the segment, for example, due to surface irregularity and/or curvature of the segment).

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A pump system comprising:
a pump comprising a housing having three pump attachment features;
a mounting bracket having three bracket attachment features; and
three fastener assemblies that are each coupled to one of the pump attachment features and to one of the bracket attachment features to form an attachment, wherein each of three attachment axes extend through the pump attachment feature, the bracket attachment feature, and the fastener assembly at each attachment, and wherein the three attachment axes are perpendicular to each other.

2. The pump system according to claim 1, wherein the pump attachment features include at least two peripheral pump attachment features and a lateral pump attachment feature, which are respectively coupled to two peripheral bracket attachment features and a lateral bracket attachment feature.

3. The pump system according to claim 2, wherein the attachment axes include two peripheral attachment axes and a lateral attachment axis, wherein the peripheral attachment axes each pass through one of the two peripheral pump attachment features and are perpendicular to each other, and the lateral attachment axis passes through the lateral pump attachment feature.

4. The pump system according to claim 3, wherein the two peripheral attachment axes extend through a central axis, and the lateral attachment axis is parallel to and spaced apart from the central axis.

5. The pump system according to claim 4, wherein the central axis is a central axis of the housing.

6. The pump system according to claim 2, wherein the peripheral pump attachment features are at different rotational positions and a common radial position relative to a central axis, the rotational positions being spaced apart by 90 degrees.

7. The pump system according to claim 1, wherein each of the pump attachment features is a threaded bore, each of the bracket attachment features is a circular aperture, and each of the fastener assemblies includes a threaded fastener coupled to one of the pump attachment features and an isolator coupled to one of the bracket attachment features.

8. The pump system according to claim 7, wherein each fastener assembly and the bracket attachment feature coupled thereto are cooperatively configured to provide a mechanical fail-safe to prevent removal of the fastener assembly from the bracket attachment feature.

9. The pump system according to claim 8, wherein each fastener assembly includes at least one of a T-washer or a plate washer, wherein an outer diameter of the T-washer or the plate washer is greater than an inner diameter of the bracket attachment feature to provide the mechanical fail-safe.

10. The pump system according to claim 1, wherein the mounting bracket includes a base having:
two side segments that are planar and parallel to each other;
an end segment that is planar and extends perpendicularly between the two side segments; and
two flange segments, wherein each of the two flange segments extends outward from one of the side segments.

11. The pump system according to claim 10, wherein the two flange segments are arranged at a perpendicular angle relative to each other.

12. The pump system according to claim 10, wherein each of the flange segments defines one of the bracket attachment features.

13. The pump system according to claim 10, wherein the end segment defines one of the bracket attachment features.

14. A mounting bracket for a pump system, comprising:
a base having:
two side segments;
an end segment extending between the two side segments, wherein the end segment defines a lateral bracket attachment feature having an attachment axis passing through the lateral bracket attachment feature that is perpendicular to portions of the end segment immediately surrounding the lateral bracket attachment feature; and
flange segments extending outward from each of the side segments, wherein each of the flange segments defines one of two peripheral bracket attachment features that each have one of two other attachment axes passing through the peripheral bracket attachment feature that is perpendicular to portions of the flange segment immediately surrounding the peripheral bracket attachment feature;
wherein the attachment axes passing through each of the peripheral bracket attachment features intersect each other at a perpendicular angle; and
wherein the attachment axis passing through the lateral bracket attachment feature is perpendicular to the attachment axes passing through each of the peripheral bracket attachment features;
wherein the lateral bracket attachment feature and the peripheral bracket attachment features are configured to couple to a pump with fastener assemblies.

15. The mounting bracket according to claim 14, wherein:
the lateral bracket attachment feature is positioned and oriented for coupling to a lateral pump attachment feature having an attachment axis passing through the lateral pump attachment feature; and
each of the peripheral bracket attachment features is positioned and oriented for coupling to one of multiple peripheral pump attachment feature of a pump each having one of the other attachment axes passing through the peripheral pump attachment feature;

wherein the attachment axes passing through each of the peripheral pump attachment features intersect each other at a perpendicular angle; and wherein the attachment axis passing through the lateral pump attachment feature is perpendicular to the attachment axes passing through each of the peripheral pump attachment features.

16. The mounting bracket according to claim 14, wherein each of the peripheral bracket attachment features and the lateral bracket attachment feature are apertures configured to receive and engage an isolator of a fastener assembly.

17. A pump comprising:
a housing comprising:
at least two peripheral pump attachment features defined by the housing and spaced apart rotationally relative to a central axis of the housing, wherein the at least two peripheral pump attachment features are located at a common radial distance from the central axis and at a common axial position along the central axis;
a flange protruding radially away from a periphery of the housing; and
a lateral pump attachment feature defined by the flange, wherein the lateral pump attachment feature is rotationally spaced between the at least two peripheral pump attachment features relative to the central axis and is axially spaced away from the at least two peripheral pump attachment features along the central axis;
wherein each of the at least two peripheral pump attachment features has an attachment axis passing through the peripheral pump attachment feature;
wherein the lateral pump attachment feature has an attachment axis passing through the lateral pump attachment feature;
wherein the attachment axes passing through the peripheral pump attachment features intersect each other at a perpendicular angle; and
wherein the attachment axis passing through the lateral pump attachment feature is perpendicular to the attachment axes passing through the peripheral pump attachment features.

18. The pump according to claim 17, wherein:
the lateral pump attachment feature is positioned and oriented for being coupled to a corresponding lateral bracket attachment feature of a bracket using a fastener assembly; and
the at least two peripheral pump attachment features are positioned and oriented for being coupled to two corresponding peripheral bracket attachment features of the bracket using two other fastener assemblies.

19. The pump according to claim 17, wherein the housing further includes:
a first pair of peripheral pump attachment features having a first radial position and a first axial position relative to a central axis of the housing; and
a second pair of peripheral pump attachment features having equal rotational spacing to the first pair of peripheral pump attachment features relative to the central axis of the housing, wherein the second pair of peripheral pump attachment features is located at the first radial position and a second axial position relative to the central axis of the housing.

* * * * *